United States Patent
Sagnard et al.

(10) Patent No.: US 9,897,245 B2
(45) Date of Patent: Feb. 20, 2018

(54) POLYMERIC FOAM INSULATION SYSTEM FOR PIPES

(71) Applicant: Dow Global Technologies LLC, Midland, MI (US)

(72) Inventors: Alain Sagnard, Lachen (CH); Lars Massueger, Zurich (CH)

(73) Assignee: Dow Global Technologies LLC, Midland, MI (US)

(*) Notice: Subject to any disclaimer, the term of this patent is extended or adjusted under 35 U.S.C. 154(b) by 508 days.

(21) Appl. No.: 14/396,862

(22) PCT Filed: May 28, 2013

(86) PCT No.: PCT/US2013/042798
§ 371 (c)(1),
(2) Date: Oct. 24, 2014

(87) PCT Pub. No.: WO2014/035501
PCT Pub. Date: Mar. 6, 2014

(65) Prior Publication Data
US 2015/0140243 A1 May 21, 2015

Related U.S. Application Data

(60) Provisional application No. 61/656,542, filed on Jun. 7, 2012.

(51) Int. Cl.
*B32B 5/24* (2006.01)
*B32B 5/18* (2006.01)
(Continued)

(52) U.S. Cl.
CPC .............. *F16L 59/029* (2013.01); *B32B 1/08* (2013.01); *B32B 5/028* (2013.01); *B32B 5/18* (2013.01);
(Continued)

(58) Field of Classification Search
CPC . B32B 1/08; B32B 2250/03; B32B 2262/101; B32B 2266/0292;
(Continued)

(56) References Cited

U.S. PATENT DOCUMENTS 2,119,415 A * 5/1938 Bodge ................. B28B 19/0038
249/164
3,807,458 A * 4/1974 Royston .................. F16L 1/026
138/141

(Continued)

FOREIGN PATENT DOCUMENTS

CN           1862070      11/2006
CN    201651577 U      11/2010
(Continued)

OTHER PUBLICATIONS

Search report from corresponding Japanese application 2015-516057, dated Feb. 9, 2017.
(Continued)

*Primary Examiner* — Yan Lan
(74) *Attorney, Agent, or Firm* — Steven W. Mork

(57) ABSTRACT

A pipe insulation system that serves as insulation for a length of pipe contains section of thermoplastic polymer foam that fit circumferentially around a length of pipe, rings of melt barrier material that fit circumferentially around the length of pipe and abut adjacent sections of thermoplastic foam, mesh around the sections of thermoplastic polymer foam and rings of melt barrier material, a metallic covering enclosing the thermoplastic polymer foam, melt barrier material and mesh, and a support band that fits circumferentially around the metallic covering and that holds the pipe insulation system against a length of pipe around which the pipe insulation resides. A ring of melt barrier material is present at the top and bottom of non-horizontal length of (Continued)

pipe and within any 250 centimeter distance along the length of pipe.

9 Claims, 1 Drawing Sheet

(51) Int. Cl.
| | | |
|---|---|---|
| *B32B 5/02* | (2006.01) | |
| *B32B 1/08* | (2006.01) | |
| *F16L 59/02* | (2006.01) | |
| *F16L 59/10* | (2006.01) | |

(52) U.S. Cl.
CPC ............ *B32B 5/245* (2013.01); *F16L 59/021* (2013.01); *F16L 59/027* (2013.01); *F16L 59/028* (2013.01); *F16L 59/10* (2013.01); *B32B 2250/03* (2013.01); *B32B 2262/101* (2013.01); *B32B 2266/0214* (2013.01); *B32B 2266/0228* (2013.01); *B32B 2266/0278* (2013.01); *B32B 2266/0292* (2013.01); *B32B 2266/04* (2013.01); *B32B 2266/045* (2013.01); *B32B 2266/053* (2016.11); *B32B 2266/057* (2016.11); *B32B 2266/06* (2013.01); *B32B 2266/08* (2013.01); *B32B 2266/126* (2016.11); *B32B 2305/022* (2013.01); *B32B 2305/38* (2013.01); *B32B 2307/304* (2013.01); *B32B 2597/00* (2013.01); *Y10T 428/1321* (2015.01); *Y10T 428/1366* (2015.01)

(58) Field of Classification Search
CPC ............ B32B 2266/04; B32B 2266/06; B32B 2266/08; B32B 2305/022; B32B 2305/38; B32B 2307/304; B32B 2597/00; B32B 5/028; B32B 5/18; B32B 5/245; B32B 2266/0214; F16L 59/021; F16L 59/027; F16L 59/028; F16L 59/029; F16L 59/10; Y10T 428/1321; Y10T 428/1366

See application file for complete search history.

(56) References Cited

U.S. PATENT DOCUMENTS

| | | | |
|---|---|---|---|
| 4,162,093 A | 7/1979 | Sigmund | |
| 4,878,520 A | 11/1989 | Nakamura et al. | |
| 5,017,314 A * | 5/1991 | Zemanek | F16L 59/161 264/112 |
| 7,513,645 B2 | 4/2009 | Marka et al. | |
| 7,624,762 B2 * | 12/2009 | Cohen | B32B 15/08 138/125 |
| 2004/0161562 A1 | 8/2004 | Graeter et al. | |
| 2009/0220713 A1 * | 9/2009 | Wang | C03C 11/007 428/34.4 |

FOREIGN PATENT DOCUMENTS

| | | |
|---|---|---|
| DE | 20106009 | 7/2001 |
| JP | 1981S56154322 U | 11/1981 |
| JP | 1982S57143491 U | 9/1982 |
| JP | 1985S60040895 U | 3/1985 |
| JP | 1990H02076996 A | 3/1990 |
| JP | 1991H03026898 U | 3/1991 |
| JP | 3001215 U | 2/1994 |
| JP | 1994H06182846 A | 7/1994 |
| JP | 1988S63141397 U | 6/1998 |
| JP | 2006090538 A | 4/2006 |

OTHER PUBLICATIONS

Search report from corresponding Chinese 201380029865.4 application, dated Jul. 19, 2016.

* cited by examiner

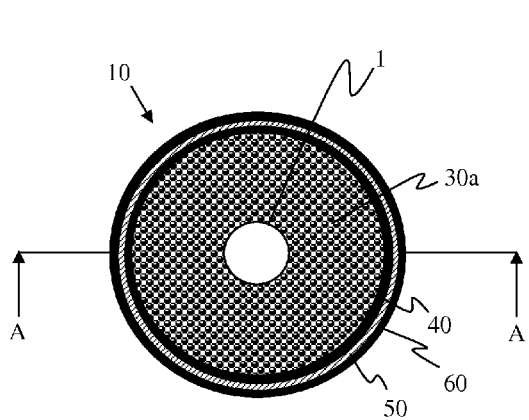
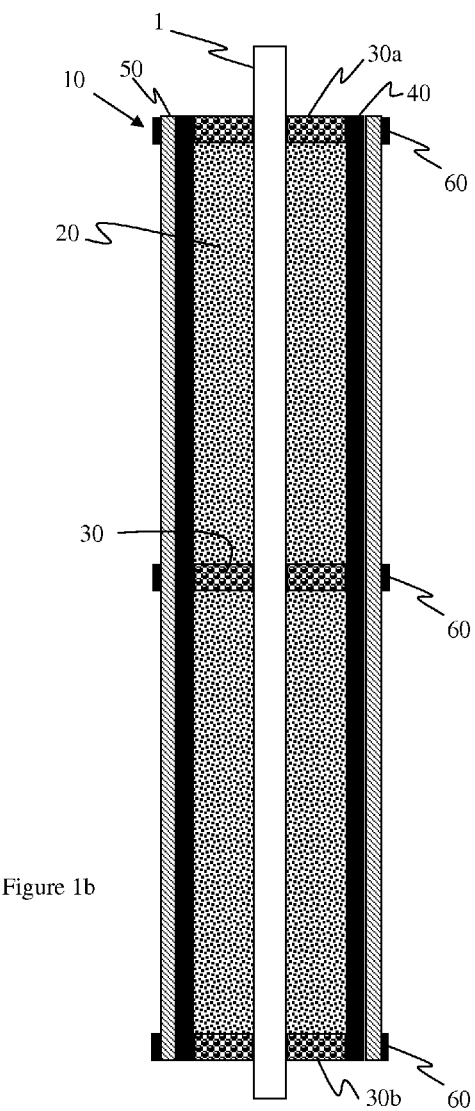
Figure 1a
Figure 1b

POLYMERIC FOAM INSULATION SYSTEM FOR PIPES

BACKGROUND OF THE INVENTION

Field of the Invention

The present invention relates to a polymeric foam insulation system for pipes.

Introduction

Effective 1 Jul. 2012, new standards shall take effect governing classifications of fire testing for building material in Europe. Prior to that date, classifications were determined by classifying the fire testing performance of individual components of a building structure. The new standards require testing of building systems containing all components together. This constitutes a paradigm shift in fire performance testing in Europe.

The new standard classifies fire test performance under EN13501-1. Classifications for linear pipe insulation fall into a range of $A1_L$-$F_L$. Classifications above $F_L$ correspond to increasing (improved) fire resistant performance as the classification approaches $A1_L$. A classification of $F_L$ corresponds to failing to achieve a Class E rating under EN ISO 11925-2 testing. A classification of $E_L$ corresponds to passing EN ISO 11925-2 testing, yet such a classification is sill insufficient for many applications. In order to achieve a classification of $D_L$, $C_L$ or $B_L$, the pipe insulation must pass tests under both EN ISO 11925-2 and EN 13823.

Thermoplastic polymer foam-based insulation systems for vertically oriented linear pipes have struggled under the EN13501-1 classification rating, in particular they have struggled to achieve a classification of $D_L$ or better, especially $C_L$ or better. Therefore, there is a need to develop an insulating system that is suitable insulating linear pipes, particularly vertically oriented pipes, that improves performance over current thermoplastic polymer foam-based pipe insulation under this new European fire test standard.

BRIEF SUMMARY OF THE INVENTION

The present invention provides a thermoplastic polymer foam-based insulation system for linear pipes that has improved performance over current thermoplastic polymer foam based insulation under the European EN13501-1 classification for linear pipe insulation. Embodiments of the present invention can achieve a classification of $C_L$ or higher with a thermoplastic polymer foam thickness of 40 millimeters or more under the European EN13501-1 standard. Embodiments of the present invention can achieve a classification of $D_L$ or higher with a thermoplastic polymer foam thickness of 50 millimeters or more under the European EN13501-1 standard.

Improving performance under the new fire performance classification required more than optimizing flame retardant properties of each individual component of the insulating system. Rather, the present invention is a result of analyzing how a pipe insulating system comprising thermoplastic polymer foam performs as a whole in a fire test and then designing system modifications to the insulating system as a whole in order to improve test performance. Without being bound by theory, the present invention addresses a possible concern that thermoplastic foam structures tend to collapse more quickly than desired under an EN13823 test conditions as the thermoplastic polymer melts and channels form (chimney effect), channels through which fire and heat can travel to accelerate decomposition of the polymer foam. Attempting to merely enclose the thermoplastic polymer foam more tightly from the source of flame proved counterproductive by trapping heat in with the foam and accelerating melting of the foam and the chimney effect.

The present invention provides an insulation system specifically designed to restrict flow of molten thermoplastic polymer foam insulation formation of channels that cause a chimney effect.

In a first aspect, the present invention is a pipe insulation system that serves as insulation for a length of pipe, the system comprising: (a) sections of thermoplastic polymer foam that fit circumferentially around the length of pipe where each section extends lengthwise along the length of pipe for a distance less than the entire length of the pipe; (b) rings of melt barrier material that fit circumferentially around the length of pipe and abut any adjacent section of thermoplastic foam, wherein the melt barrier material has a melting temperature of 800 degrees Celsius or higher or that decomposes instead of melting; (c) a mesh around the sections of thermoplastic polymer foam and rings of melt barrier material and extending along the length of the pipe covered by the insulation system, the mesh comprising mesh members spaced apart to define spaces between mesh members, the spaces having an average size of ten square millimeters or more and 200 square millimeters or less and the mesh members being made of material that either has a melting temperature of 800 degrees Celsius or higher or that decomposes instead of melting residing; (d) a metallic covering enclosing the thermoplastic polymer foam, melt barrier material and mesh; and (e) a support band around that fits circumferentially around the metallic covering and that holds the pipe insulation system against a length pipe around which the pipe insulation resides; wherein a ring of melt barrier material is present at the top and bottom of non-horizontal lengths of pipe and between sections of thermoplastic polymer foam along the length of pipe so that at least a portion of a ring of melt barrier material is present within any 250 centimeter distance along the length of the length of pipe.

The present invention is useful for insulating pipes, particularly vertically oriented pipes. The invention is particularly desirable for insulating pipes, even vertically oriented pipes, while achieving higher classifications under EN13501-1 than currently known thermoplastic polymer foam-based pipe insulation systems. The present invention is useful for achieving a linear pipe insulation that can achieve a classification of $C_L$ or higher with a thermoplastic polymer foam thickness of 40 millimeters or more under the European EN13501-1 standard. The present invention is also useful for achieving a linear pipe insulation that can achieve a classification of $D_L$ or higher under EN13501-1 while using thermoplastic polymer foam having a thickness that is 50 millimeters or more.

BRIEF DESCRIPTION OF THE DRAWINGS

FIG. 1a illustrates an embodiment of the present invention applied to a vertical length of pipe as viewed from the top of the pipe.

FIG. 1b illustrates a side cut-away view of the pipe and pipe insulation system of FIG. 1a.

DETAILED DESCRIPTION OF THE INVENTION

Test methods refer to the most recent test method as of the priority date of this document when a date is not indicated with the test method number. References to test methods contain both a reference to the testing society and the test method number. The following test method abbreviations and identifiers apply herein: ASTM refers to American Society for Testing and Materials; EN refers to European Norm; DIN refers to Deutsches Institut für Normung; and ISO refers to International Organization for Standards.

"Multiple" means two or more. "And/or" means "and, or as an alternative". All ranges include endpoints unless otherwise indicated.

"Polymer", unless indicated otherwise, refers to both homopolymer and copolymer. Unless otherwise indicated, "copolymer" includes block copolymer, graft copolymer, alternating copolymer and random copolymer.

"Vertical" refers to alignment parallel to Earth's gravitational field at the location of the article being referenced. "Horizontal" refers to alignment perpendicular to the Earth's gravitational field at the location of the article being referenced. "Vertically oriented" and "non-horizontal" are synonymous and refer to an orientation having a vertical component, preferably entirely vertical. For example anything that is not perfectly horizontal is vertically oriented.

"Top" refers to the highest (most remote from the center of the Earth) portion of a vertically oriented article, generally the highest surface of that article. "Bottom" refers to the lowest, typically lowest surface, of an article where lowest refers to closest to the center of the Earth.

The present invention comprises sections of thermoplastic polymer foam. Thermoplastic polymer foam comprises a thermoplastic polymer continuous phase matrix that defines multiple cells or void defined therein. The polymer foam can be open-cell foam or closed-cell foam. An open-cell foam has an open cell content of 30 percent (%) or more, and can have an open cell content of 50% or more, 60% or more, 70% or more 80% or more, 90% or more, 95% or more and can have 100% open cell content. Closed-cell foam has an open cell content of less than 30%, and can have an open cell content of 20% or less, 10% or less, 5% or less and can have zero percent open cell content. Determine percent open cell content according to American Society for Testing and Materials (ASTM) method D6226-05. Desirably, the thermoplastic polymer foam is closed-cell foam in order to be more thermally insulating. The thermoplastic polymer foam desirably has a density of 25 kilograms per cubic meter (kg/m$^3$) or more, preferably 30 kg/m$^3$ or more and more preferably 35 kg/m$^3$ or more and at the same time desirably has a density of 80 kg/m$^3$ or lower and can have a density of 50 kg/m$^3$ or less and even 40 kg/m$^3$ or less. Lower densities are particularly desirable for thicker thermoplastic polymer foam in order to minimize polymer available for melting while maximizing insulation value. Determine thermoplastic polymer foam density according to ASTM D1622-08.

Suitable thermoplastic polymers that can form the continuous phase matrix of the thermoplastic polymer foam include any one or any combination of more than one thermoplastic polymer. Olefinic polymers, alkenyl-aromatic homopolymers and copolymers comprising both olefinic and alkenyl aromatic components are suitable. Examples of suitable olefinic polymers include homopolymers and copolymers of ethylene and propylene.

Desirably, the foam core is a polymeric foam core having a polymer matrix comprising or consisting of one or more than one alkenyl-aromatic polymer. An alkenyl-aromatic polymer is a polymer containing alkenyl aromatic monomers polymerized into the polymer structure. Alkenyl-aromatic polymer can be homopolymers, copolymers or blends of homopolymers and copolymers. Alkenyl-aromatic copolymers can be random copolymers, alternating copolymers, block copolymers or any combination thereof and may be linear, branched or a mixture thereof.

Styrenic polymers are particularly desirably alkenyl-aromatic polymers. Styrenic polymers have styrene monomer polymerized in the polymer backbone and include styrene homopolymer, copolymer and blends thereof.

Examples of styrenic copolymers suitable for the present invention include copolymers of styrene with one or more of the following: acrylic acid, methacrylic acid, ethacrylic acid, maleic acid, itaconic acid, acrylonitrile, maleic anhydride, methyl acrylate, ethyl acrylate, isobutyl acrylate, n-butyl acrylate, methyl methacrylate, vinyl acetate and butadiene.

Styrene-acrylonitrile copolymer (SAN) is a particularly desirable alkenyl-aromatic polymer for use in the present invention because of its ease of manufacture and monomer availability. SAN copolymer can be a block copolymer or a random copolymer, and can be linear or branched. SAN has higher heat distortion temperature than polystyrene homopolymer, which provides for foam having a higher use temperature than polystyrene homopolymer foam. Desirable embodiments of the present process employ polymer compositions that comprise, even consist of SAN. The one or more alkenyl-aromatic polymer, even the polymer composition itself may comprise or consist of a polymer blend of SAN with another polymer such as polystyrene homopolymer.

Whether the polymer composition contains only SAN, or SAN with other polymers, the acrylonitrile (AN) component of the SAN is desirably present at a concentration of one weight-percent (wt %) or more, preferably five wt % or more, more preferably ten wt % or more based on the weight of all thermoplastic polymers in the thermoplastic polymer matrix. The AN component of the SAN is desirably present at a concentration of fifty wt % or less, typically thirty wt % or less based on the weight of all thermoplastic polymers in the thermoplastic polymer matrix.

The thermoplastic polymer foam can be any type of thermoplastic polymer foam in the broadest scope of the present invention including both extruded and expanded foam, however, extruded foam is most desirable. Expanded foam, such as expanded polystyrene (EPS) foam comprises multiple foam components, such as beads or strands, of expandable foam that are generally expanded within a constraint (for example, within a mold or between constraining plates) to force the expanding foam structures together so that they fuse to one another to form a composite foam structure. Expanded foams are characterized by having a skin of polymer extending throughout the polymer foam and surrounding groups of foam cells. These skins correspond to the surfaces of the expanding foam components that contacted and fused together during expansion and molding of the resulting foam composite. The skin of polymer has a greater density and/or thickness than cell walls on average or the resulting foam structure on average. Expanded bead foam and strand foam are two types of expanded polymer foams. Expanded bead foam comprises multiple foam beads that expand and fuse together to form a foam structure having groupings of cells enclosed in shells of polymer skin corresponding to surface of the individual beads. Strand foam comprises multiple strands of expanding polymer foam that contact one another and fuse together resulting in a foam structure having grouping of cells within polymer skins that generally extend in one dimension of the resulting foam.

In contrast to expanded polymer foam, extruded polymer foams such as extruded polystyrene (XPS) foam are made by extruding and expanding a single expanding mass of polymer into polymer foam that is free of polymer skin networks having a density or thickness greater than the average cell wall or foam density that extend throughout the polymer foam and enclosing groups of cells. Extruded polymer foam expands from a single mass of polymer rather than result by fusing multiple expanding foam masses together. Each expanding mass has a relatively thick or high density skin around it. Therefore, expanded polymer foam has networks of this skin throughout the foam while extruded polymer foam only has such a skin around its outer surface.

Extruded polymer foam is more desirable for the thermoplastic polymer foam of the present invention. Extruded polymer foam tends to be a better thermal insulator and more moisture resistant than expanded polymer foam. The network of relatively high density polymer skin can result in thermal shorts throughout the polymer foam, which are absent in extruded foam. Moisture can also find its way through voids along fused skins forming a network throughout expanded foam and undesirably result in both a decrease in thermal insulation and other problems associated with moisture. Desirably, the thermoplastic polymer foam is closed-cell extruded polystyrene foam.

The thermoplastic polymer foam can comprise additives dispersed within the polymer matrix of the thermoplastic polymer foam. Examples of suitable additives include any one or any combination of more than one of the following: flame retardant components (for example: brominated polymers, non-polymeric brominated compounds, phosphorous components, and chlorinated compounds), infrared attenuating agents (for example: graphite, carbon black, titanium dioxide, alumina boehmite, and metal flake), processing aids, colorants and pigments.

The sections of thermoplastic polymer foam fit circumferentially around the length of a pipe that the pipe insulation of the system of the present invention is insulating, where each section extends lengthwise along the pipe. Sections refer to lengths of thermoplastic polymer foam that extend lengthwise along the pipe. Fitting circumferentially around a length of pipe means wrapping around the pipe, preferably entirely around the pipe, in a plane perpendicular to the length dimension of the pipe while extending lengthwise along the length of pipe. Length corresponds to the largest dimension of an article and, with respect to a pipe, the direction though which something can flow within the pipe. Sections of thermoplastic polymer foam can comprise two or more pieces of thermoplastic foam that fit together to wrap circumferentially around a length of pipe.

The sections of thermoplastic polymer foam extend along the pipe for a distance less than the entire length of the pipe. The present pipe insulation system further comprises rings of melt barrier material that fit circumferentially around the length of pipe and that are located at the top and bottom ends of non-horizontal sections of the length of pipe and between sections of thermoplastic polymer foam along the length of pipe. The spacing between rings of melt barrier material are such that at least a portion of a ring of melt barrier material is present within any 250 centimeter distance, preferably within any 100 centimeter distance, and more preferably within any 50 centimeter distance along the length of the length of pipe. The rings of melt barrier material abut any adjacent section of thermoplastic foam along the length of pipe. The rings of melt barrier material can either be adhered to adjacent sections of thermoplastic foam or be non-adhered and independent from adjacent section of thermoplastic foam.

The rings of melt barrier material desirably extend at least ten millimeters, preferably 20 millimeters or more and can extend for 30 millimeters or more, 40 millimeter or more even 50 millimeters or more and at the same time generally extends for 300 millimeters or less, and can extend for 200 millimeter or less, 100 millimeter or less, 80 millimeters or less, 50 millimeters or less and even 30 millimeter or less along the length dimension of the length of pipe.

The rings of melt barrier material serve at least the following functions in the present invention when a length of pipe insulated with the present invention is exposed to fire: (1) prevents free flow of molten thermoplastic polymer foam towards the bottom of non-horizontal lengths of pipe; (2) inhibits chimney effect during of flames freely burning up towards the top of non-horizontal lengths of pipe when exposed to fire; and (3) in combination with the support band the rings of melt barrier hold the pipe insulation system in place during a fire even when the thermoplastic polymer foam component melts. Therefore, the melt barrier material desirably remains intact when exposed to a fire for a longer period of time than the thermoplastic foam in the system. Preferably, the melt barrier material remains intact throughout the duration of exposure to a fire, at least during the testing method specified for EN13501-1 classifications. In that regard, the melt barrier material either decomposes instead of melting or has a melting temperature of 800 degrees Celsius (° C.) or higher, preferably 1000 or higher.

In the broadest scope of the present invention the melt barrier material can be made of, for example, any one or combination of materials selected from polymer, metal or mineral. At the same time, the melt barrier material can be solid, fibrous or cellular. For example, the melt barrier material can be foam (that is, a cellular structure having a continuous matrix of material that defines a plurality of cells therein) that is made from polymer, metal, mineral or any combination thereof. The melt barrier material is desirably foam in order to minimize the weight of the insulating system and increase the thermal resistance of the system. In particular, the melt barrier material is desirably foam of a material that is a thermal conductive material, such as a polymeric foam, foamed glass, foamed silicate or aerogel. For example, the melt barrier material is desirably polymeric foam such as a polyisocyanurate. Desirably, the melt barrier material is polymeric foam, such as polyisocyanurate foam, that has an open cell content of less than 30 percent as determined by ASTM D6226-05 in order to optimize thermal insulating properties through the melt barrier material. Foamed glass is also a particularly melt barrier material. In order to keep the weight of the pipe insulation system to a minimum, it is desirable for the melt barrier material to have a density of 500 kilograms per cubic meter ($kg/m^3$) or less, preferably 250 $kg/m^3$ or less, more preferably 180 $kg/m^3$ or less and can be 120 $kg/m^3$ or less, 100 $kg/m^3$ or less, 80 $kg/m^3$ or less and even 50 $kg/m^3$ or less. At the same time, is it desirable for the melt barrier material to have a density of 30 $kg/m^3$ or more, more desirably 35 $kg/m^3$ or more and can be 40 $kg/m^3$ or more 80 $kg/m^3$ or more, or even 100 $kg/m^3$ or more in order to optimize structural integrity when exposed to flames. Determine foam density according to ASTM D1622-08.

The thermoplastic polymer foam and the rings of melt barrier material can have the same thickness or have different thicknesses. "Thickness" refers to the dimension perpendicular the length and extending in a direction radially from the length of pipe. The thermoplastic polymer and the rings of melt barrier material can have the same thickness. However, the thermoplastic polymer and the rings of melt barrier material can have different thicknesses. Additionally, different rings of melt barrier material can have different thicknesses from one another. For example, the rings of melt barrier material, or a selection of rings of melt barrier material, can have a thickness greater than the thermoplastic polymer foam or thinner than the thermoplastic polymer foam.

The thermoplastic polymer foam and the rings of melt barrier material can independently (meaning the thermoplastic polymer foam, the rings of melt barrier material or any selection of the thermoplastic polymer foam and one or more or all of the rings of melt barrier material) have a thickness of five millimeters or more, ten millimeters or more 20 millimeters or more, 25 millimeters or more, 30 millimeters or more, 40 millimeters or more, 50 millimeters or more, 60 millimeters or more, 70 millimeters or more and even 75 millimeters or more. A the same time, the thickness of the thermoplastic polymer foam and the melt barrier material is generally 50 centimeters or less and can be 30 centimeters or less, 10 centimeters or less, 80 millimeters or less, 75 millimeters or less, even 50 millimeters or less. Increasing the thickness of the thermoplastic polymer foam tends in to decrease the thermal conduction through the foam. Increasing the thickness of the melt barrier material creates a greater barrier for molten thermoplastic polymer foam from draining downwards and flames from rising upwards along a length of pipe.

The pipe insulation system can be free of rubber-like material or fiber reinforced polyester and/or epoxy compounds between sections of thermoplastic polymer foam. The pipe insulation system can be completely free of rubber-like material or fiber reinforced polyester and/or epoxy compounds.

The pipe insulation system of the present invention further comprises a mesh around the sections of thermoplastic polymer foam and ring of melt barrier material and extending along the length of the pipe covered by the insulation system. The mesh can be, for example, a woven or non-woven type material. The mesh wraps around the sections of thermoplastic polymer foam and melt barrier material so that when the pipe insulation system is insulating a length of pipe the thermoplastic polymer foam and melt barrier material are between the mesh and the length of pipe. The mesh serves to assist in holding the thermoplastic polymer foam and melt barrier material in place when exposed to heat and fire.

The mesh comprises mesh members spaced apart to define spaces between mesh members. The spaces between mesh members are important because if the spaces are too small then the mesh will trap heat against the thermoplastic polymer foam and accelerate melting of the thermoplastic polymer foam. If the spaces between mesh members are too large, then molten thermoplastic polymer foam will freely flow out through the mesh. The spaces between mesh members have an average size of ten square millimeters (sq mm) or more and can be 10 sq mm or more, 20 sq mm or more, 30 sq mm or more, 50 sq mm or more, 75 sq mm or more, 100 sq mm or more, even 150 sq mm or more. At the same time, the spaces between the mesh members have an average size of 200 sq mm or less and can have an average size of 175 sq mm or less, 150 sq mm or less, 125 sq mm or less and even 100 sq mm or less.

The mesh members are made of material that either decomposes instead of melting or has a melting temperature of 800° C. or higher, preferably 1000° C. or higher. Suitable mesh member materials include, for example, glass, glass fiber, mineral fiber, metal fiber, and aramid fibers.

A metallic covering encloses the thermoplastic polymer foam, melt barrier material and mesh. The metallic covering is desirably made of aluminum. The thickness (as measured in a radial direction relative to a length of pipe around which the pipe insulation resides) is desirably 10 micrometers or more, preferably 20 micrometers or more and can be 30 micrometer or more, 40 micrometers or more, 50 micrometers or more, 75 micrometers or more, even 100 micrometers or more. At the same time, the thickness of the metallic covering is generally 1000 micrometers or less, and can be 500 micrometers or less, even 100 micrometers or less.

The metallic covering can, for example, be in the form of a tube or a sheet that wraps around the mesh and thermoplastic polymer foam. When the metallic covering is in the form of a sheet that wraps around the mesh and thermoplastic polymer foam, it is desirable for the metallic covering to overlap itself, mechanically interlock with itself or both overlap and mechanically interlock with itself so as to ensure it remains in place even if the thermoplastic polymer foam inside of it melts away. If the metallic covering overlaps itself it desirably overlaps as much as 25% of the circumference or more, preferably 50% of the circumference or more around the mesh and thermoplastic polymer foam. It is further desirable for the overlapping metallic covering to be adhered to itself either using an adhesive or by mechanically interlocking with itself or with both an adhesive and by mechanically interlocking. Lengths of metallic covering that extend less than the full length of the pipe insulation system also desirably overlap, mechanically interlock with or both overlap and mechanically interlock with adjacent lengths of metallic covering. Overlapping lengths of metallic covering are desirably adhered to one another, mechanically interlocked with one another or both adhered to one another and mechanically interlocked with one another. Suitable adhesives for adhering the metallic covering to itself include epoxy adhesives, acrylic adhesives and polyurethane adhesives.

Optionally, an epoxy adhesive and even a layer of epoxy coating reside between the mesh and the sections of thermoplastic polymer foam. Alternatively, or additionally, an epoxy adhesive or even a layer of epoxy coating can reside between the metallic covering and the mesh. Epoxy adhesives and coatings can be useful to adhere components of the present pipe insulation together.

Optionally, a metallic covering as described can also reside around the thermoplastic polymer foam between the mesh member and the thermoplastic polymer foam. Such a configuration sandwiches the mesh member between two metallic covering layers. While both metallic covering layers are as described herein, the two metallic covering layers can be different or the same with respect to one another. That is, the metallic covering layers can, for example, differ in metal composition, thickness, or both metal composition and thickness. It is desirable for the metallic covering between the mesh and the polymeric foam to be as thick or, more desirably, thicker than the metallic covering enclosing the thermoplastic polymer foam, melt barrier material and mesh.

Support bands around the pipe insulation system of the present invention hold the pipe insulation system to a pipe around which the pipe insulation system resides. Support bands fit circumferentially around the metallic covering of the pipe insulation system and squeeze or compress the pipe insulation system against a length of pipe around which the pipe insulation system resides. Desirably, position the support bands so that they extend around the pipe insulation system with a ring of melt barrier material between the support band and the length of pipe around which the pipe insulation system resides. In such an orientation the ring of melt barrier material serves as a firm and stable component of the pipe insulation system even if exposed to heat or fire, allowing the support band to keep the pipe insulation system in place even if the thermoplastic polymer foam sections melt.

Support bands are desirably metal but can be made of any material that has a melting temperature of 800 degrees Celsius or higher or that decomposes instead of melting. Examples of suitable support band materials include steel, aluminum and glass-reinforced plastic banding. It is desirable to provide a support band around the rest of the pipe insulation system at each ring of melt barrier material so that at each ring of melt barrier material there is a support band squeezing the pipe insulation system against a pipe around which the pipe insulation system resides.

FIGS. 1a and 1b illustrate (not to scale) an embodiment of the present invention as applied onto a length of pipe. FIG. 1a illustrates an end-on view looking down at the top of the invention applied to a vertical pipe. FIG. 1b illustrates a cut-away side view along viewing lines A shown in FIG. 1a.

FIGS. 1a and 1b illustrate Example 1 in the form of pipe insulation system 10 is around 22 millimeter diameter pipe 1. Pipe insulation system 10 comprises sections of extruded polystyrene foam 20 (only visible in FIG. 1b because ring of melt barrier material 30a precludes viewing in FIG. 1a) that extend 950 millimeters lengthwise along pipe 1. Extruded polystyrene foam 20 has a density of about 35 kg/m$^3$, an open cell content of less than 5% (for example STYROFOAM™ FB-X brand extruded polystyrene foam, STYROFOAM is a trademark of The Dow Chemical Company). Ring of melt barrier material 30a resides at the top of pipe insulation system 10. Ring of melt barrier material 30b resides at the bottom of pipe insulation system 10. Rings of melt barrier material 30 reside at spacings of 950 millimeters along the distance of the length of pipe 1. The rings of melt barrier material 30a, 30b, and 30 are each 50 millimeters tall (that is, they extend 50 millimeters along the length dimension of pipe 1). The rings of melt barrier material are all closed-cell polyisocyanurate foam having a density of about 35 kg/m$^3$ (For example, TARECPIR™ brand insulation, TARECPIR is a trademark of Kinspand Tarec). Mesh 40 extends the length of the pipe insulation system and wraps around sections of polystyrene foam 20 and rings of melt barrier material 30a, 30b, and 30. Mesh 40 is glass fibers having a spacing between fibers of 25 square millimeters. An epoxy adhesive (not shown) resides between Mesh 40 and extruded polystyrene foam 20. Aluminum foil 50 wraps around the rest of pipe insulation system 10 and extends lengthwise along length of pipe 1. Aluminum foil 50 has a thickness of 40-75 micrometers (ideally, approximately 70 micrometers) as measured in a direction radially relative to length of pipe 1. Support bands 60 extend around the rest of the pipe insulation system and are located around rings of melt barrier material 30.

Based on testing of similar systems, pipe insulation system 10 is expected to achieve a Class $D_L$ rating or better according to EN13501-1 classification ratings.

An additional example, Example 2, of a pipe insulation system of the present invention is similar to that illustrated in FIGS. 1a and 1b, but with the following changes:

(a) there is a second metal barrier material (aluminum foil that is 30-50 micrometers thick, preferably about 50 micrometers) between the mesh material 40 and the thermoplastic polymer foam 20 so that mesh 40 is sandwiched between the second metal barrier material and metal barrier material 50;

(b) Aluminum foil 50 (which is a metal barrier material) is 30-50 micrometers (ideally, approximately 50 micrometers) thick;

(c) Rings of melt barrier material 30a, 30b and 30 are foamed glass having a density of 120 kg/m$^3$; and (d) The thickness of thermoplastic polymer foam 20 and rings of melt barrier material 30, 30a and 30b are all at the same time either 25-30 millimeters, 40 millimeters, or 50 millimeters.

Under EN 13501-1, this additional example using a thickness of 25-30 millimeters achieves a $C_L$ classification and is expected to achieve a classification of $B_L$ by using a thermoplastic polymer foam having a density of 33 kg/m$^3$ or less. When the thickness of the thermoplastic polymer foam and rings of melt barrier material are all 40 millimeters or 50 millimeters this additional example achieves a $D_L$ classification and is expected to achieve a $C_L$ classification using a thermoplastic polymer foam having a density of 33 kg/m$^3$ or less.

As a point of reference, Comparative Example A is similar to Example 2 except the extruded polystyrene foam is 35 kg/m$^3$ density STYROFOAM™ FB-X brand extruded polystyrene foam and has a thickness of 40 millimeters. There are no melt barrier rings in the pipe insulation system of Comparative Example A, only the extruded polystyrene foam in the aluminum foil/mesh/aluminum foil vapor barrier wrap. The burn properties of Comparative Example A are as follows: FIGRA 0.4 MJ of 285.20 Watts per second, THR600 of 28.80 Mega Joules, SMOGRA of 156.60 square meters per second per second, and SPR600 of 1970 square meters. As a result, Example 3 achieves a SBI Classification under EN13501-1 of $D_L$ s3 d0.

Example 3 is similar to Example 2, but with the following changes: Pipe insulation system 10 is 1500 millimeters (mm) long. The extruded polystyrene foam (STYROFOAM IBTRBEX brand extruded polystyrene foam) has a density of 33 kg/m$^3$ and a thickness of 50 mm. Each ring of melt barrier material (30, 30a and 30b) are 100 mm tall and 50 mm thick. Height is measured along pipe 1. Thickness is measured in the radial dimension of the pipe.

The melt barrier material is 120 kg/m$^3$ density foamed glass (FOAMGLAS™ T4, FOAMGLAS is a trademark of Pittsburgh corning Corporation). The spacing between the rings of melt barrier material is 450 mm as measured between the center of rings of melt barrier material. When subject to EN13823 burn property testing Example 3 has the following characteristics: FIGRA 0.4 MJ of 103.30 Watts per second, THR600 of 11.90 Mega Joules, SMOGRA of 68.0 square meters per second per second, and SPR600 of 668.4 square meters. As a result, Example 3 achieves a SBI Classification under EN13501-1 of $C_L$ s2 d0.

Example 3, as compared with Comparative Example A, reveals the tremendous improvement in EN13501-1 classification due to the presence of the melt barrier material rings in the pipe insulation system of the present invention.

The invention claimed is:

1. A pipe insulation system that serves as insulation for a length of pipe, the system comprising:
   a. sections of thermoplastic polymer foam that fit circumferentially around the length of pipe where each section extends lengthwise along the length of pipe for a distance less than the entire length of the pipe;

b. rings of melt barrier material that fit circumferentially around the length of pipe and abut any adjacent section of thermoplastic foam, wherein the melt barrier material has a melting temperature of 800degrees Celsius or higher or that decomposes at a temperature of 800degrees Celsius or higher instead of melting;

c. a mesh around the sections of thermoplastic polymer foam and rings of melt barrier material and extending along the length of the pipe covered by the insulation system so that when the pipe insulation system is insulating a length of pipe the thermoplastic polymer foam and the melt barrier material are between the mesh and the length of pipe, the mesh comprising mesh members spaced apart to define spaces between mesh members, the spaces having an average size of ten square millimeters or more and 200 square millimeters or less and the mesh members being made of material that either has a melting temperature of 800 degrees Celsius or higher or that decomposes at a temperature of 800 degrees or higher instead of melting;

d. a metallic covering enclosing the thermoplastic polymer foam, melt barrier material and mesh;

e. a support band around that fits circumferentially around the metallic covering and that holds the pipe insulation system against a length pipe around which the pipe insulation resides; and f. a metallic covering around the thermoplastic polymer foam and between the thermoplastic polymer foam and the mesh such that the mesh resides between two metallic coverings;

wherein a ring of melt barrier material is present at the top and bottom of non-horizontal lengths of pipe and between sections of thermoplastic polymer foam along the length of pipe so that at least a portion of a ring of melt barrier material is present within any 250 centimeter distance along the length of the length of pipe and wherein (i) the thermoplastic polymer foam is a styrene polymer foam having a density of less the 36 kilograms per cubic meter; (ii) the rings of melt barrier material are foamed glass; (iii) the mesh is a glass fiber mesh; (iv) the metallic covering between the thermoplastic polymer foam and the mesh is an aluminum foil having a thickness of 30-50 micrometers; and (v) the metallic covering enclosing the thermoplastic polymer foam, melt barrier material and mesh is an aluminum foil having a thickness of 30-50micrometers; and wherein the thickness of the thermoplastic polymer foam and rings of melt barrier material each have a thickness of 25 millimeters or more and 50 millimeters or less.

2. The pipe insulation system of claim 1, wherein each ring of melt barrier material extends at least 10 millimeters along the length dimension of the length of pipe.

3. The pipe insulation system of claim 1, wherein the melt barrier material has a density of 35-120 kilograms per cubic meter as determined by ASTM D1622-08.

4. The pipe insulation system of claim 1, wherein the thermoplastic polymer foam is closed cell extruded polystyrene foam.

5. The pipe insulation system of claim 1, wherein both the thermoplastic foam and rings of barrier material have a thickness that is 40 millimeters or more.

6. The pipe insulation system of claim 1, wherein the mesh members are made of glass.

7. The pipe insulation system of claim 1, further comprising an epoxy adhesive between the mesh and metallic covering.

8. The pipe insulation system of claim 1, further comprising an epoxy coating between the thermoplastic polymer foam and the mesh.

9. The pipe insulation system of claim 1, further characterized by any 100 centimeter length of the pipe insulation system contains at least a portion of a ring of melt barrier material.

* * * * *